(12) United States Patent
Shimizu et al.

(10) Patent No.: US 11,697,415 B2
(45) Date of Patent: Jul. 11, 2023

(54) BRAKING FORCE CONTROL SYSTEM, DEVICE, AND METHOD

(71) Applicant: TOYOTA JIDOSHA KABUSHIKI KAISHA, Toyota (JP)

(72) Inventors: Masato Shimizu, Toyota (JP); Shun Sato, Toyota (JP); Katsumi Kono, Toyota (JP); Atsushi Ayabe, Toyota (JP); Noritake Mitsutani, Toyota (JP); Hiroki Nakano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/226,530

(22) Filed: Apr. 9, 2021

(65) Prior Publication Data

US 2021/0221376 A1    Jul. 22, 2021

Related U.S. Application Data

(63) Continuation of application No. 16/272,000, filed on Feb. 11, 2019, now Pat. No. 11,001,263.

(30) Foreign Application Priority Data

Mar. 7, 2018   (JP) .................................. 2018-040871
Aug. 2, 2018   (JP) .................................. 2018-145972

(51) Int. Cl.
*B60W 10/10*         (2012.01)
*B60W 30/18*         (2012.01)
(Continued)

(52) U.S. Cl.
CPC ...... *B60W 30/18127* (2013.01); *B60W 10/06* (2013.01); *B60W 10/10* (2013.01);
(Continued)

(58) Field of Classification Search
CPC ............... B60T 8/1766; B60T 2201/04; B60T 2260/08; B60W 30/18127; B60W 10/06;
(Continued)

(56) References Cited

U.S. PATENT DOCUMENTS 6,470,257 B1   10/2002   Seto
7,034,482 B2   4/2006    Komiyama et al.
(Continued)

FOREIGN PATENT DOCUMENTS

CN    1680133 A      10/2005
CN    104494599 A    4/2015
(Continued)

OTHER PUBLICATIONS

English translation of JPH1132404A; http://translationportal.epo.org, Jul. 19, 2022 (Year: 2022).*

(Continued)

*Primary Examiner* — Roger L Pang
(74) *Attorney, Agent, or Firm* — Oliff PLC

(57) ABSTRACT

A vehicular breaking force control system that includes a control device including a processor that acquires a plurality of longitudinal accelerations from a driving assistance system, and calculates a driving/braking request when the vehicle is in a coasting state in which an acceleration operation or a deceleration operation are not performed during running of the vehicle. The processor further acquires a driving force lower limit set for a powertrain actuator having a set gear ratio, and distributes the driving/braking request to at least one of (i) a powertrain system including the powertrain actuator and (ii) a brake system including a brake actuator. The driving/braking request is distributed to the at least one of the powertrain system and the brake system based on the acquired driving force lower limit.

9 Claims, 4 Drawing Sheets

(51) Int. Cl.
  *B60W 10/06* (2006.01)
  *B60W 10/184* (2012.01)
  *B60W 30/14* (2006.01)
  *B60T 8/1766* (2006.01)
  *B60W 30/16* (2020.01)

(52) U.S. Cl.
  CPC .......... *B60W 10/184* (2013.01); *B60W 30/14* (2013.01); *B60W 30/18072* (2013.01); *B60W 30/18136* (2013.01); *B60T 8/1766* (2013.01); *B60T 2201/04* (2013.01); *B60T 2260/08* (2013.01); *B60W 30/16* (2013.01); *B60W 30/162* (2013.01); *B60W 2510/0623* (2013.01); *B60W 2510/184* (2013.01); *B60W 2510/244* (2013.01); *B60W 2510/246* (2013.01); *B60W 2520/10* (2013.01); *B60W 2520/105* (2013.01); *B60W 2540/10* (2013.01); *B60W 2540/12* (2013.01); *B60W 2556/45* (2020.02); *B60W 2556/65* (2020.02); *B60W 2710/1005* (2013.01)

(58) Field of Classification Search
  CPC ............... B60W 10/10; B60W 10/184; B60W 30/18072; B60W 30/18136; B60W 2540/10; B60W 2520/105; B60W 2540/12; B60W 2710/1005; B60W 30/18109; B60W 2710/18
  USPC .......................................................... 477/92
  See application file for complete search history.

(56) References Cited

U.S. PATENT DOCUMENTS

| | | |
|---|---|---|
| 7,178,618 B2 | 2/2007 | Komeda et al. |
| 7,275,795 B2 | 10/2007 | Nishina et al. |
| 8,882,632 B2 | 11/2014 | Kumazaki et al. |
| 10,967,840 B2 | 4/2021 | Oh et al. |
| 2005/0027402 A1 | 2/2005 | Koibuchi et al. |
| 2005/0187694 A1 | 8/2005 | Shiiba et al. |
| 2005/0218717 A1 | 10/2005 | Nishina et al. |
| 2005/0218718 A1 | 10/2005 | Iwatsuki et al. |
| 2006/0173601 A1 | 8/2006 | Bassiere et al. |
| 2006/0241844 A1 | 10/2006 | Mori et al. |
| 2007/0207895 A1 | 9/2007 | Fuchs et al. |
| 2009/0259370 A1 | 10/2009 | Kaigawa et al. |
| 2014/0336907 A1 | 11/2014 | Mori et al. |
| 2017/0349179 A1* | 12/2017 | Cunningham ...... B60W 10/026 |
| 2019/0299995 A1 | 10/2019 | Tochigi et al. |
| 2020/0023819 A1* | 1/2020 | Noumura ........ B60W 30/18072 |
| 2020/0391732 A1* | 12/2020 | Kaneta ............ B60W 30/18136 |
| 2022/0048493 A1* | 2/2022 | Crisp ................. B60W 50/0098 |

FOREIGN PATENT DOCUMENTS

| | | |
|---|---|---|
| DE | 10334536 A1 | 2/2004 |
| EP | 3100926 A1 | 12/2016 |
| JP | H10-280990 A | 10/1998 |
| JP | H11-032404 A | 2/1999 |
| JP | H11-266505 A | 9/1999 |
| JP | 2003-191774 A | 7/2003 |
| JP | 2006-297994 A | 11/2006 |
| JP | 2007-069787 A | 3/2007 |
| JP | 2007-261417 A | 10/2007 |
| JP | 2010-151154 A | 7/2010 |
| JP | 2016-179703 A | 10/2016 |
| WO | 2006/042628 A1 | 4/2006 |
| WO | 2013/076806 A1 | 5/2013 |
| WO | 2013/084697 A1 | 6/2013 |
| WO | 2018/190022 A1 | 10/2018 |

OTHER PUBLICATIONS

Oct. 19, 2020 Office Action issued in U.S. Appl. No. 16/272,000.
Apr. 5, 2023 Office Action issued in U.S. Appl. No. 17/382,892.

* cited by examiner

BRAKING FORCE CONTROL SYSTEM, DEVICE, AND METHOD

This is a Continuation of application Ser. No. 16/272,000 filed on Feb. 11, 2019, which claims the benefit of Japanese Application No. 2018-040871 filed on Mar. 7, 2018, and Japanese Application No. 2018-145972 filed on Aug. 2, 2018. The disclosure of the prior applications is hereby incorporated by reference herein in its entirety.

BACKGROUND OF THE INVENTION

Field of the Invention

The present invention relates to a braking force control system provided in a vehicle or the like.

Description of the Background Art

In a vehicle, for ease of driving, it is important to perform acceleration/deceleration as desired by a user without delay, and various techniques therefor have been proposed. Patent Literature 1 (Japanese Laid-Open Patent Publication No. H10-280990) discloses a fuel cut control device in which a decelerating force is complemented by an alternator, an air-conditioner, a brake, a gear shift, etc., in the case of prohibiting fuel cut during deceleration in order to prevent degradation of a catalyst when the temperature of the catalyst is high. Patent Literature 2 (Japanese Laid-Open Patent Publication No. 2006-297994) discloses a vehicle integrated control device in which a control target determined in accordance with an amount of operation by a driver is distributed to a drive system and a control system in accordance with an allocation ratio, and the control target before distribution is transmitted to a stabilization system and the stabilization system is caused to calculate a correction process, whereby synchronization of distributed values of the control target by the stabilization system is unnecessary, and delay is reduced with fail safety maintained.

During coasting driving in which a user does not depress any of an accelerator pedal and a brake pedal during driving, a braking force expected by the user can be estimated on the basis of a vehicle speed, a drive mode, a road surface gradient, etc. Meanwhile, a braking force can be determined by running resistance of the vehicle and control states of actuators that generate a braking force, such as a gear shift, fuel cut, and an alternator. FIG. 6 shows an example of a graph that compares a target braking force estimated as a braking force expected by the user during coasting driving to an actually generated braking force. In the example shown in FIG. 6, settings are made such that, as a vehicle speed increases, the target braking force smoothly increases. However, during coasting driving, the actuators at least partially operate independently on the basis of requests from individual control systems for the actuators, and the actual braking force deviates from the target braking force. In particular, for example, the actual braking force greatly fluctuates through the target braking force with 40 km/h as a boundary between the case where fuel cut is performed and the case where fuel cut is not performed. As described above, the braking force of the entire vehicle is left to take its own natural course, and is not necessarily suitable for the user.

SUMMARY OF THE INVENTION

In view of the above-described problem, an object of the present invention is to provide a vehicular braking force control system, device, and method that can suitably obtain a braking force expected by a user in coasting driving.

In order to solve the above-described problem, an aspect of the present invention is a vehicular braking force control system including: a plurality of actuators capable of generating a braking force for a vehicle; a coasting state detection unit configured to detect that a coasting state, which is a state where an accelerator operation is not performed and a brake operation is not performed during running of the vehicle, has been established; a target braking force calculation unit configured to calculate a target braking force on the basis of a state of the vehicle when the coasting state detection unit detects that the coasting state has been established; and a braking force distribution control unit configured to determine a distribution braking force that is a braking force to be caused to be generated by each actuator, such that the distribution braking force is equal to or less than a braking force generable by the actuator and a sum of the distribution braking forces is equal to the target braking force, and perform control of causing each actuator to generate the distribution braking force.

According to the present invention, it is possible to provide a vehicular braking force control system, device, and method that can suitably obtain a braking force expected by a user in a coasting state of a vehicle.

DESCRIPTION OF THE PREFERRED EMBODIMENTS (Embodiment)

A braking force control system according to an embodiment of the present invention calculates a suitable target braking force on the basis of a vehicle speed, etc., in a coasting state of a vehicle, collectively performs cooperative control of a plurality of actuators such as a brake and a transmission, and causes each actuator to generate a braking force within a range where a braking force is generable by the actuator, thereby achieving a target braking force.

Hereinafter, the embodiment of the present invention will be described in detail with reference to the drawings.

<Configuration>

Figure 1:
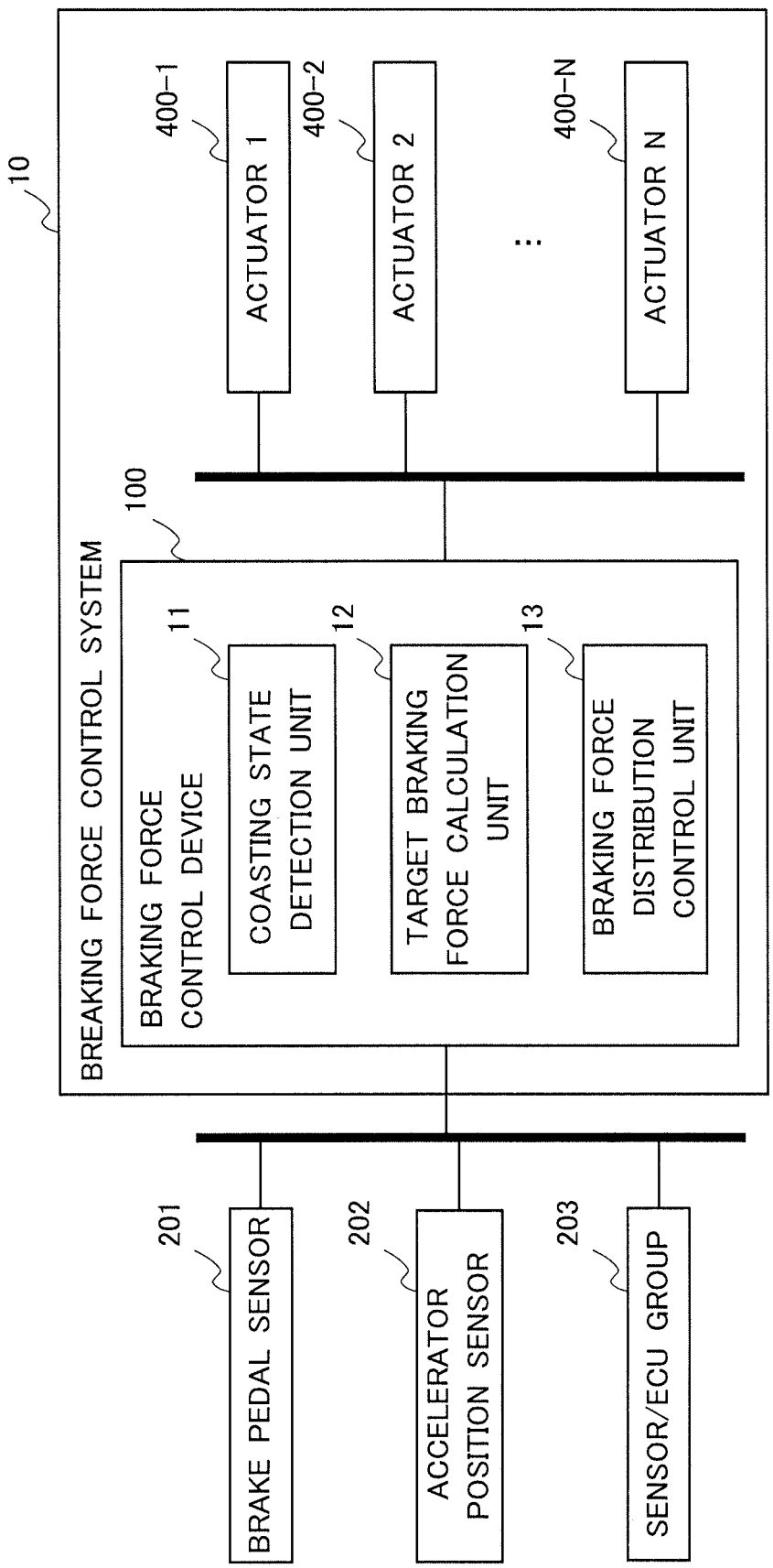
FIG. 1 is a functional block diagram of a braking force control system according to an embodiment of the present invention and a peripheral portion thereof.

FIG. 1 shows a functional block diagram of a braking force control system 10 according to the present embodiment, and a peripheral portion thereof. The braking force control system 10 includes a braking force control device 100 and a plurality of actuators 400 (400-1 to 400-N). The actuators 400 are a brake, an alternator, an engine, a transmission, etc., which can generate a braking force in a vehicle that is running. The braking force control device 100 includes a coasting state detection unit 11, a target braking force calculation unit 12, and a braking force distribution control unit 13. The braking force control system 10 is provided in the vehicle and connected to a brake pedal sensor 201, an accelerator position sensor 202, and a sensor/ECU group 203 including other various sensors and a control unit called an ECU. The braking force control device 100 acquires information representing various states of the vehicle and the vehicle periphery that are detected or controlled by the brake pedal sensor 201, the accelerator position sensor 202, and the sensor/ECU group 203, and controls the actuators 400 on the basis of the acquired information.

<Process>

Figure 2:
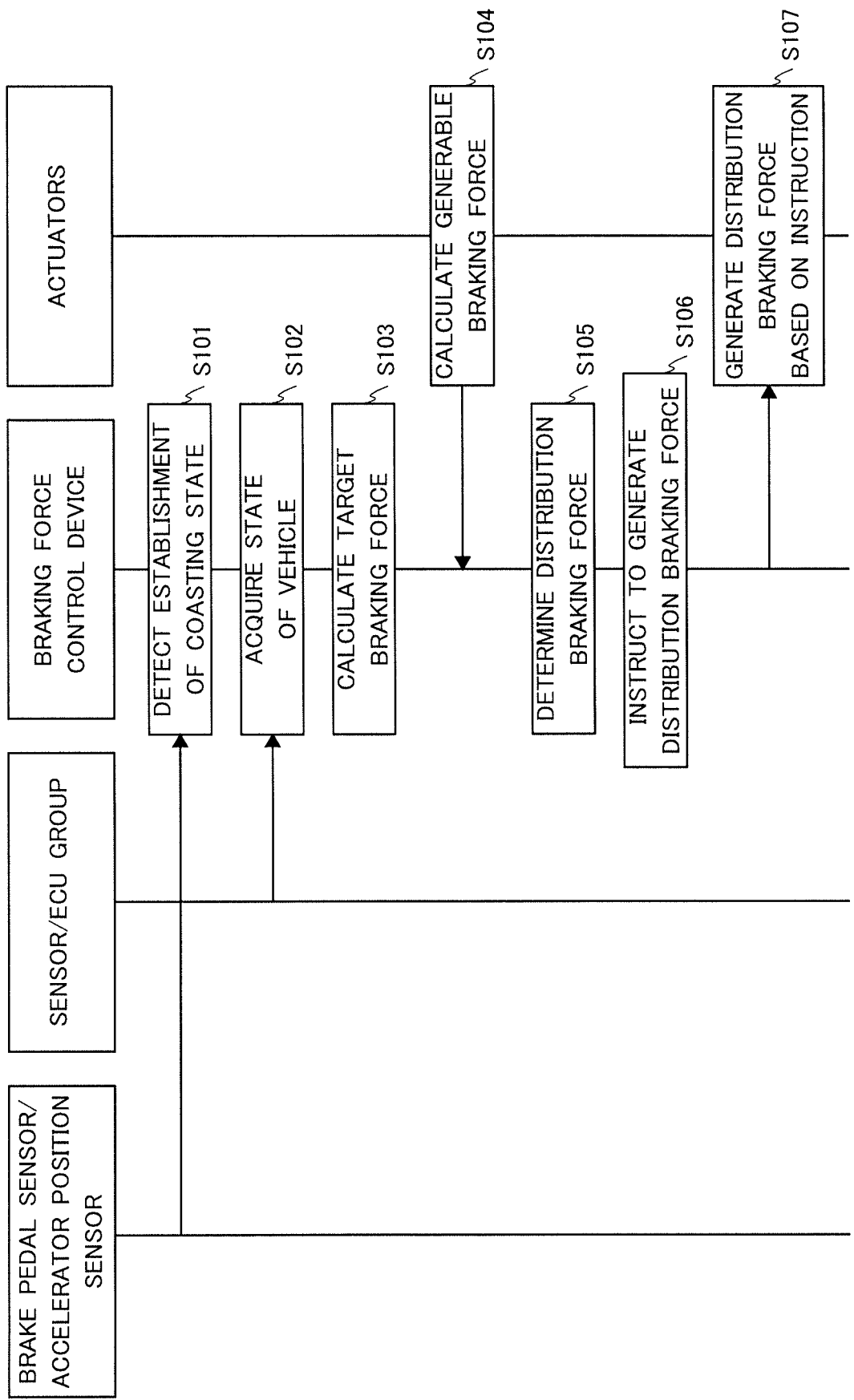
FIG. 2 is a sequence diagram showing a process of the braking force control system according to the embodiment of the present invention.
Figure 3:
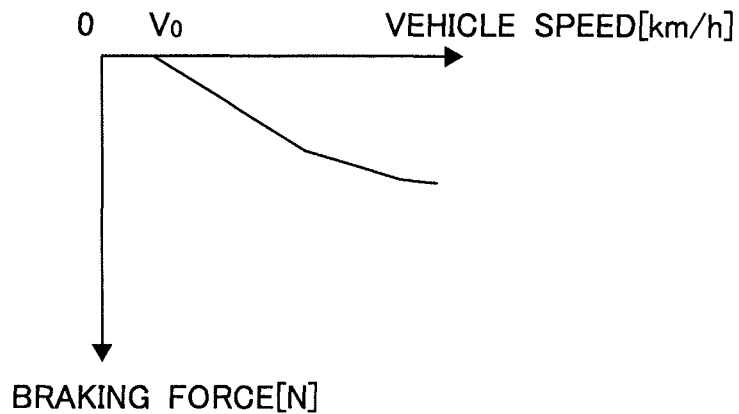
FIG. 3 is a graph showing an example of a target braking force map according to the embodiment of the present invention.
Figure 4:
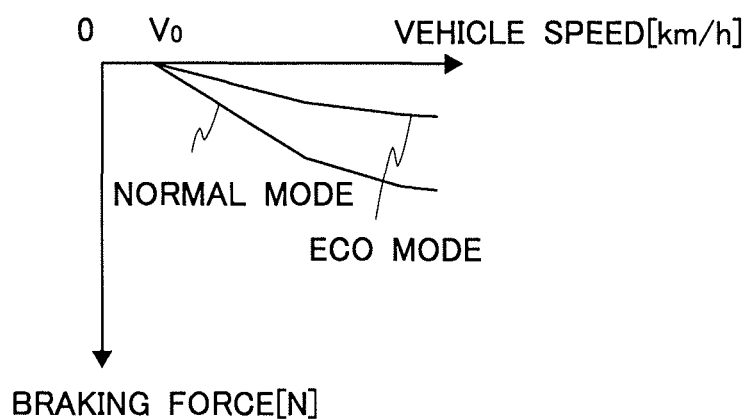
FIG. 4 is a graph showing an example of the target braking force map according to the embodiment of the present invention.
Figure 5:
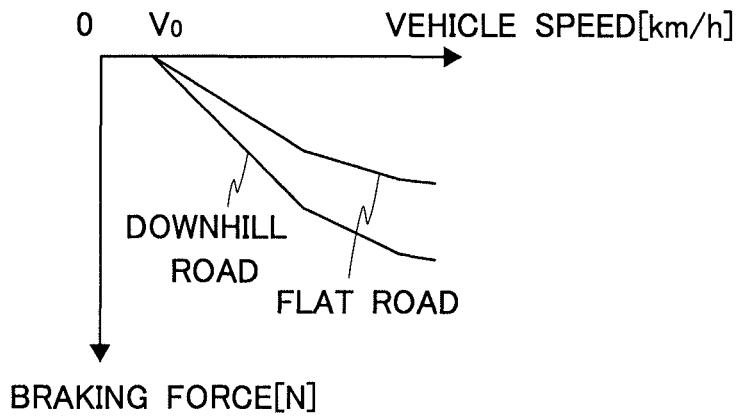
FIG. 5 is a graph showing an example of the target braking force map according to the embodiment of the present invention.
Figure 6:
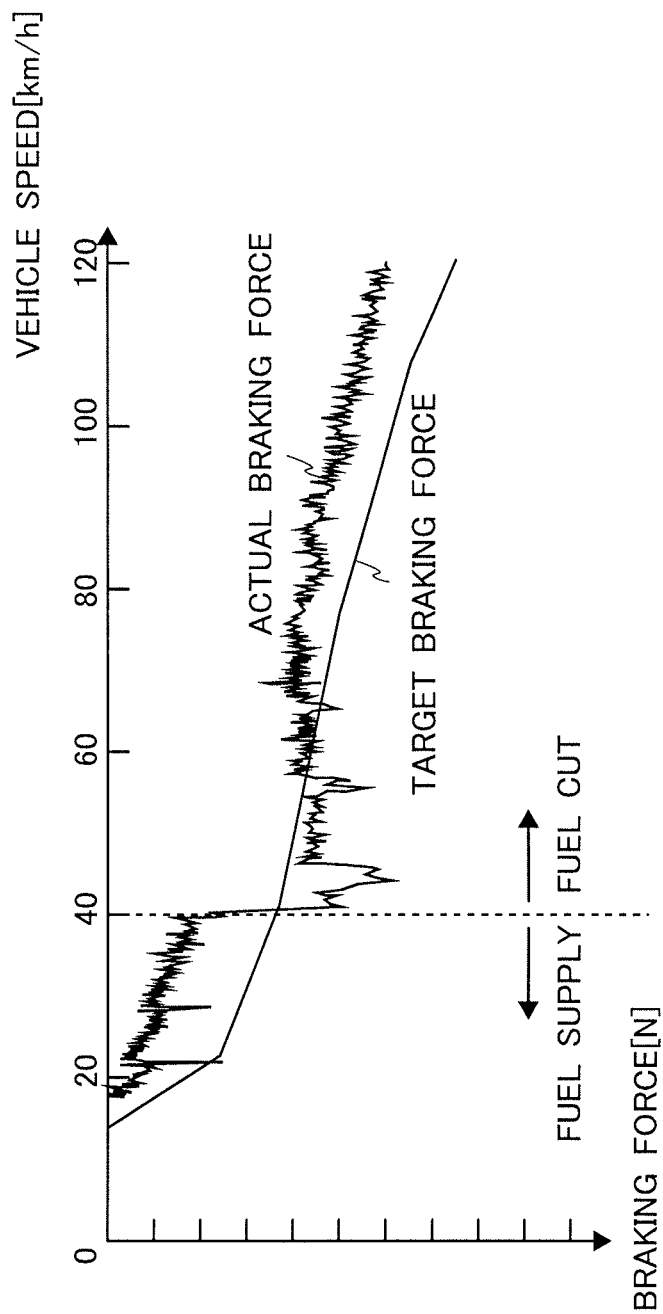
FIG. 6 is a graph showing an example of a braking force and a target braking force during coasting driving in conventional art.

Hereinafter, a process executed by each component of the braking force control system 10 will be described. FIG. 2 is a sequence diagram illustrating the process. In addition, FIGS. 3, 4, and 5 are each a diagram showing an example of a map used for calculating a target braking force. The process is started when a user performs coasting driving in which the user does not perform an accelerator operation and does not perform a brake operation.

(Step S101): The coasting state detection unit 11 acquires information representing that a brake depression amount and an accelerator position are 0, from the brake pedal sensor 201 and the accelerator position sensor 202, respectively, and detects that a coasting state has been established.

(Step S102): The target braking force calculation unit 12 acquires a running state, a control state, and the ambient environment of the vehicle, as a state of the vehicle, from the sensor/ECU group 203. For example, as a state of the vehicle, the target braking force calculation unit 12 acquires a vehicle speed from a vehicle speed sensor or the like, acquires a drive mode representing a running characteristic designated by the user, from an ECU that manages various driving characteristics of the vehicle, or acquires the gradient of a road surface from an acceleration sensor or the like. Alternatively, the target braking force calculation unit 12 may acquire map information from a car navigation system, or acquire information about another vehicle or an obstacle around the vehicle, etc., from a camera or a radar.

(Step S103): The target braking force calculation unit 12 calculates a target braking force, as a suitable braking force estimated to be expected by the user, on the basis of the vehicle state. Examples of a method for calculating a target braking force will be described with reference to FIGS. 3, 4, and 5. In each of the examples shown in these drawings, a map that determines a target braking force with respect to a vehicle speed in advance is used. In each example, settings are made such that a braking force is generated when a vehicle speed exceeds a predetermined value V0, and is increased as the vehicle speed increases. In the example shown in FIG. 4, in consideration of a drive mode representing a running characteristic designated by the user, settings are made such that, when the drive mode is an eco mode that designates running with low fuel consumption, a braking force is lower than that in the case of a normal mode that is a drive mode other than the eco mode. For example, a map shown in FIG. 3 is used as a map for the case of the normal mode, and a map for the eco mode shown in FIG. 4 can be generated by using a value obtained by multiplying a value in the map shown in FIG. 3 by a coefficient α that is lower than 1. In the example shown in FIG. 5, in further consideration of a road surface gradient, settings are made such that, when a road surface is downhill, a braking force is made larger than that in the case of a flat road. For example, the map shown in FIG. 3 is used as a map for the case of a flat road, and a map for a downhill road shown in FIG. 5 can be generated by using a value obtained by multiplying a value in the map shown in FIG. 3 by a coefficient β that is higher than 1. In addition, settings may be made such that, when a road surface is uphill, a braking force is made smaller than that in the case of a flat road. For example, the map shown in FIG. 3 is used as a map for the case of a flat road, and a map for an uphill road can be generated by using a value obtained by multiplying a value in the map shown in FIG. 3 by a coefficient γ that is lower than 1. In addition, a target braking force may be calculated on the basis of both the drive mode and the road surface gradient. For example, the map shown in FIG. 3 is used as a map for the case of a flat road and the normal mode, and a map for a downhill road and the eco mode can be generated by using a value obtained by multiplying a value in the map shown in FIG. 3 by the coefficient α and the coefficient β. Similarly, a map for an uphill road and the eco mode can be generated by using a value obtained by multiplying a value in the map shown in FIG. 3 by the coefficient α and the coefficient γ. In addition to or instead of these, another state may be used. For example, when presence of another vehicle within a predetermined distance in front of the vehicle is detected by a camera or a radar, a larger target braking force may be calculated than when such a vehicle is not present. According to these examples, a particularly suitable target braking force that fulfills a user's expectation can be calculated in accordance with various states of the vehicle. The above description is merely illustrative, and the method for calculating a target braking force is not particularly limited. As described above, a target braking force may be calculated by using different coefficients in accordance with the state of the vehicle, or a map that is individually generated in advance for each state may be used.

(Step S104): Each actuator 400 includes a calculation unit that calculates a generable braking force. In the case where the actuator 400 is, for example, a brake, the generable braking force can be calculated on the basis of one or a combination of a rating, an estimated friction material temperature based on latest use history within a predetermined period, a braking torque request value from another control system, etc. In addition, in the case where the actuator 400 is, for example, an alternator, the generable braking force can be calculated on the basis of one or a combination of a rating, a battery temperature, a battery charge amount (SOC), a charge/discharge request value from another control system, etc. Moreover, in the case where the actuator 400 is, for example, an engine, the generable braking force can be calculated on the basis of one or a combination of a catalyst warm-up state, a fuel cut request from another control system, etc. Furthermore, in the case where the actuator 400 is, for example, a transmission, the generable braking force can be calculated with constant accuracy on the basis of one or a combination of the level of noise generated in accordance with an engine speed and assumed at the time of downshifting, a gear shift request from another control system, etc. Each actuator 400 is not limited to these devices, and may be another device, or the generable braking force may be calculated on the basis of factors other than the above-described factors. The calculation unit of each actuator 400 notifies the braking force control device 100 of the calculated generable braking force. The calculation unit of each actuator 400 may perform such calculation and notification of the generable braking force at all times or in response to a request from the braking force control device 100. As described above, the calculation unit of each actuator 400 calculates the generable braking force on the basis of the characteristics, the state, etc., of the actuator 400, and thus the generable braking force of each actuator 400 can be accurately calculated.

(Step S105): The braking force distribution control unit 13 allocates a distribution braking force to each actuator 400 on the basis of the generable braking force calculated by the calculation unit of each actuator 400 and the target braking force calculated by the target braking force calculation unit 12. The distribution braking force to be allocated to each actuator 400 is, for example, determined such that the distribution braking force is equal to or less than the braking force generable by the actuator 400 and the sum of the respective distribution braking forces is equal to the target braking force. That is, each distribution braking force is determined so as to satisfy a restrictive formula of Expression (1) below and also satisfy Expression (2).

Distribution braking force of actuator 400-1≤braking force generable by actuator 400-1, Distribution braking force of actuator 400-2≤braking force generable by actuator 400-2,

. . . ,

Distribution braking force of actuator 400-$N$≤braking force generable by actuator 400-$N$  Expression (1):

Distribution braking force of actuator 400-1

+distribution braking force of actuator 400-2

+ . . . ,

+distribution braking force of actuator 400-$N$

=target braking force  Expression (2):

In Expression (1), for the distribution braking force of each actuator 400, an upper limit is provided as a restriction, and a lower limit is assumed to be 0. However, for each actuator 400, a restriction that the lower limit of a braking force is larger than 0 can occur in accordance with a request from another control system. For example, in some cases, in an alternator, a request for generating power at high priority is received from a control system for a power supply when the amount of power stored in a battery is reduced, and power is generated in response to the request, whereby a braking force is generated. The braking force distribution control unit 13 may also acquire such a lower limit as a generable braking force calculated by the calculation unit of each actuator 400, and determine each distribution braking force such that the above-described Expressions (1) and (2) are satisfied and Expression (3) below is further satisfied.

Lower limit of braking force of actuator 400-1≤distribution braking force of actuator 400-1, Lower limit of braking force of actuator 400-2≤distribution braking force of actuator 400-2,

. . . ,

Lower limit of braking force of actuator 400-$N$≤distribution braking force of actuator 400-$N$  Expression (3):

Priority may be provided for each actuator 400 on the basis of a predetermined control policy, and actuators 400 to which distribution braking forces is to be allocated and values of the distribution braking forces may be determined in order of the priority. That is, a distribution braking force that is as large as possible such that each expression described above is satisfied may be allocated in order starting from the actuator 400 with highest priority, and a distribution braking force that is as small as possible may be allocated to the actuator 400 with lowest priority. For example, the priority can be determined such that the priority is increased when durability is higher, fuel consumption is lower, or a period when a braking force can be continuously generated is longer.

Regarding the actuators 400, among the transmission, the engine, the alternator, and the brake, the engine and the transmission, which constantly operate and generate or transmit a large force during running, generally have particularly high durability. As an example, when the transmission (gear shift down), the engine (fuel cut), the alternator (power generation), and the brake are higher in durability in this order, the transmission, the engine, the alternator, and the brake can be also set to be higher in priority in this order.

Some of the actuators 400 have a characteristic that it is temporarily hard to generate a braking force. In order to obtain certainty of generation of a braking force, the above-described priority may be increased for the actuator 400 having a higher possibility of being caused to generate a braking force at arbitrary timing. For example, among the transmission, the engine, the alternator, and the brake, the brake, which is designed to generate a braking force as a main purpose and has no factor that should inhibit generation of a braking force, generally has a highest possibility of being caused to generate a braking force at arbitrary timing. As an example, when the brake, the transmission, the engine, and the alternator are higher, in this order, in possibility of being caused to generate a braking force at arbitrary timing, the brake, the transmission, the engine, and the alternator can be also set to be higher in priority in this order.

In order to effectively obtain a braking force, the above-described priority may be increased for the actuator 400 having a larger generable braking force (braking torque amount). For example, among the transmission, the engine, the alternator, and the brake, the brake, which is designed to generate a braking force as a main purpose, is generally caused to generate a largest braking force. In addition, the transmission and the engine have higher mechanical resistance of internal components than the alternator, and can generate a larger braking force than the alternator. As an example, when the brake, the transmission, the engine, and the alternator are higher, in this order, in possibility of being caused to generate a large braking force, the brake, the transmission, the engine, and the alternator can be also set to be higher in priority in this order.

In order to accurately obtain a braking force, the above-described priority may be increased for the actuator 400 of which a braking force is easily controlled. For example, among the transmission, the engine, the alternator, and the brake, the brake, which is designed to generate a braking force as a main purpose, generally has a high possibility of being caused to accurately generate a desired braking force. In addition, the transmission and the alternator can control a braking force stepwise by changing a gear ratio and an amount of power generated, respectively, stepwise, as compared to fuel cut of the engine. As an example, when the brake, the transmission, the alternator, and the engine are higher, in this order, in possibility of being caused to accurately generate a braking force, the brake, the transmission, the alternator, and the engine can be also set to be higher in priority in this order.

In order to stably obtain a braking force, the above-described priority may be increased for the actuator 400 that is less susceptible to influence of disturbance and have more stable characteristics. For example, among the transmission, the engine, the brake, and the alternator, generally, a braking force of the transmission is determined in accordance with the gear ratio and is relatively less susceptible to influence of other factors. In addition, the operating characteristics of the alternator easily change depending on a difference in charge/discharge ability due to the temperature of the battery, etc. As an example, when the transmission, the engine, the brake, and the alternator are higher, in this order, in possibility of being less susceptible to influence of disturbance and having stable characteristics, the transmission, the engine, the brake, and the alternator can be also set to be higher in priority in this order.

In order to improve fuel economy or inhibit deterioration of fuel economy, the above-described priority may be increased for the actuator 400 that less adversely influences fuel economy. For example, among the transmission, the engine, the brake, and the alternator, generally, fuel cut in the engine and regenerative power generation by the alternator contribute to improvement of fuel economy. As an example, when the engine, the alternator, the transmission, and the brake are lower, in this order, in possibility of adversely influencing fuel economy, the engine, the alternator, the transmission, and the brake can be also set to be higher in priority in this order.

The above-described orders of priority are merely examples, and the methods for determining an order of priority and distribution braking forces are not limited to those described above. For example, the engine, the transmission, the alternator, and the brake can be set to be higher in priority in this order. According to this order of priority, for example, the engine and the transmission are preferentially used, so that deterioration of fuel economy can be inhibited by fuel cut of the engine and a braking force can be stably and effectively generated by the transmission. In addition, the order of priority may be set in accordance with the vehicle type, the drive mode, or the like. For example, in a fuel-efficient mode, priority may be set in order of the engine, the alternator, the transmission, and the brake, starting from one having a smaller adverse effect on fuel economy, and, in another mode, priority may be set in order of the transmission, the engine, the alternator, and the brake, starting from one having higher durability.

(Step S106): The braking force distribution control unit 13 instructs each actuator 400 to generate the allocated distribution braking force.

(Step S107): Each actuator 400 generates the distribution braking force in response to the instruction.

The above sequence is ended, for example, by the user performing an accelerator operation or a brake operation to cancel the coasting state. Until the sequence is ended, the processes from step S102 to step S106 are repeated, and braking force control corresponding to the speed of the vehicle or the like is continued. In addition, when coasting driving is performed again after the coasting state is cancelled, the process steps from step S101 are executed again. Moreover, in the case where the vehicle is an electric vehicle, a motor only needs to be used instead of the engine, etc., as an actuator. Furthermore, the configuration of each component of the braking force control system according to the present invention is not limited to that in the present embodiment, and can be variously modified as long as the functions of: the plurality of actuators capable of generating a braking force for the vehicle; the target braking force calculation unit, which calculates a target braking force on the basis of the state of the vehicle; and the braking force distribution control unit, which determines a distribution braking force to be allocated to each actuator, such that the sum of the distribution braking forces is equal to the target braking force, and performs control of causing each actuator to generate the distribution braking force, when an accelerator operation is not performed and a brake operation is not performed during running of the vehicle, can be achieved. In addition, the plurality of actuators 400 may be actuators other than the brake, the alternator, the engine, and the transmission described as examples, as long as the actuators are functional units that are provided in the vehicle and capable of generating a braking force, and a combination of actuators is not limited as long as the number of the actuators is two or more.

In the case where the vehicle includes, as an external device for the braking force control system 10, an in-vehicle device called a movement manager that integrally manages and controls movement of the vehicle, the braking force control system 10 may receive a target braking force, in the form of a braking force (N) or the like, from the movement manager.

In this case, the braking force control system 10 does not have to calculate a target braking force, and thus does not have to include the coasting state detection unit 11 and the target braking force calculation unit 12. In addition, the braking force control system 10 does not have to acquire information from the brake pedal sensor 201, the accelerator position sensor 202, the sensor/ECU group 203, etc. In this configuration, the braking force distribution control unit 13 notifies the movement manager of the range (availability) of the present generable braking force (N).

For example, the movement manager receives an acceleration/deceleration request, in the form of acceleration $(m/s^2)$ or the like, from at least still another in-vehicle device having a function to determine acceleration/deceleration or the like of the vehicle on the basis of information of various sensors or the like for driving assistance, and determines a target braking force within the range of the availability on the basis of the request and at least the availability.

The braking force distribution control unit 13 acquires a target braking force from the movement manager as described above. With such a configuration, the braking force control system 10 can receive a target braking force that matches with an acceleration/deceleration request from another in-vehicle device for performing various types of driving assistance, without independently calculating a target braking force. Accordingly, overlap of processes can be eliminated, and designing and mounting can be made easy, so that extension of a driving assistance function in the future can be easily handled. As described above, the braking force control system 10 may be mounted as a part of an integral driving assistance system (also known as "Advanced Driver Assistance Systems (ADAS)") that assumes use of a movement manager.

<Advantageous Effects>

According to the present invention, in a coasting state of the vehicle, a suitable target braking force expected by the user can be estimated on the basis of various states of the vehicle, and cooperative control of the plurality of actuators can be performed to generate a braking force such that the target braking force is achieved. Thus, suitable braking force control can be performed.

The present invention can be taken not only as a braking force control system including a braking force control device and actuators, but also as a method or a program to be executed by the braking force control device and a computer thereof, a computer-readable non-transitory storage medium having the program stored therein, or a vehicle including the braking force control system.

The present invention is useful for a braking force control system for a vehicle or the like.

What is claimed is:

1. A control device mounted on a vehicle, the control device comprising a processor programmed to:
   acquire a plurality of longitudinal accelerations from a driving assistance system;
   calculate a driving/braking request when the vehicle is in a coasting state in which an acceleration operation and a braking operation are not performed during running of the vehicle;
   acquire a driving force lower limit set for a powertrain actuator having a set gear ratio;
   distribute the driving/braking request to (i) a powertrain system including the powertrain actuator and (ii) a brake system including a brake actuator; and
   control the distribution of the driving/braking request to the powertrain system and the brake system based on the acquired driving force lower limit,
   wherein a distribution braking force allocated to each actuator is determined such that the distribution braking force is less than or equal to a braking force generable by the respective actuator, a sum of the respective distribution braking forces is equal to a target braking force, and a lower limit of braking force of each actuator is less than or equal to the distribution braking force of the respective actuator.

2. The control device according to claim 1, wherein the processor is programmed to:
   acquire an acceleration/deceleration request that matches the acquired plurality of longitudinal accelerations from another vehicle, which is different than the vehicle,
   acquire the target braking force from the other vehicle based on the acquired acceleration/deceleration request, and
   calculate the driving/braking request based on at least the acquired target braking force.

3. The control device according to claim 1, wherein the control step includes determining a priority of the allocation of the distribution braking force to each actuator and determining an amount of the distribution braking force distributed to each actuator based on the priority.

4. A method to be executed by a computer of a control device mounted on a vehicle, the method comprising steps of:
   acquiring a plurality of longitudinal accelerations from a driving assistance system;
   calculating a driving/braking request when the vehicle is in a coasting state in which an accelerator pedal operation and a brake pedal operation are not performed during running of the vehicle;
   acquiring a driving force lower limit set for a powertrain actuator having a set gear ratio;
   distributing the driving/braking request to (i) a powertrain system including the powertrain actuator and (ii) a brake system including a brake actuator; and
   controlling distribution of the driving/braking request to the powertrain system and the brake system based on the acquired driving force lower limit,
   wherein a distribution braking force allocated to each actuator is determined such that the distribution braking force is less than or equal to a braking force generable by the respective actuator, a sum of the respective distribution braking forces is equal to a target braking force, and a lower limit of braking force of each actuator is less than or equal to the distribution braking force of the respective actuator.

5. The method according to claim 4, further comprising:
   acquiring an acceleration/deceleration request that matches the acquired plurality of longitudinal accelerations from another vehicle, which is different than the vehicle, and
   acquiring the target braking force from the other vehicle based on the acquired acceleration/deceleration request, wherein the driving/braking request is calculated based on at least the acquired target braking force.

6. The method according to claim 4, wherein the control step includes determining a priority of the allocation of the distribution braking force to each actuator and determining an amount of the distribution braking force distributed to each actuator based on the priority.

7. A non-transitory computer readable storage medium storing a program to be executed by a computer of a control device mounted on a vehicle, the program including computer-executable instructions causing the computer to execute steps of:
   acquiring a plurality of longitudinal accelerations from a driving assistance system;
   calculating a driving/braking request when the vehicle is in a coasting state in which an accelerator pedal operation and a brake pedal operation are not performed during running of the vehicle;
   acquiring a driving force lower limit set for a powertrain actuator having a set gear ratio;
   distributing the driving/braking request to (i) a powertrain system including the powertrain actuator and (ii) a brake system including a brake actuator; and
   controlling the distribution of the driving/braking request to the powertrain system and the brake system based on the acquired driving force lower limit,
   wherein a distribution braking force allocated to each actuator is determined such that the distribution braking force is less than or equal to a braking force generable by the respective actuator, a sum of the respective distribution braking forces is equal to a target braking force, and a lower limit of braking force of each actuator is less than or equal to the distribution braking force of the respective actuator.

8. The non-transitory computer readable storage medium according to claim 7, wherein the computer to execute steps of:
   acquiring an acceleration/deceleration request that matches the acquired plurality of longitudinal accelerations from another vehicle, which is different than the vehicle, and
   acquiring the target braking force from the other vehicle based on the acquired acceleration/deceleration request, wherein the driving/braking request is calculated based on at least the acquired target braking force.

9. The non-transitory computer readable storage medium according to claim 7, wherein the control step includes determining a priority of the allocation of the distribution braking force to each actuator and determining an amount of the distribution braking force distributed to each actuator based on the priority.

* * * * *